M. E. CARR.
TOY VEHICLE.
APPLICATION FILED SEPT. 23, 1919.
1,345,127.
Patented June 29, 1920.
2 SHEETS—SHEET 1.
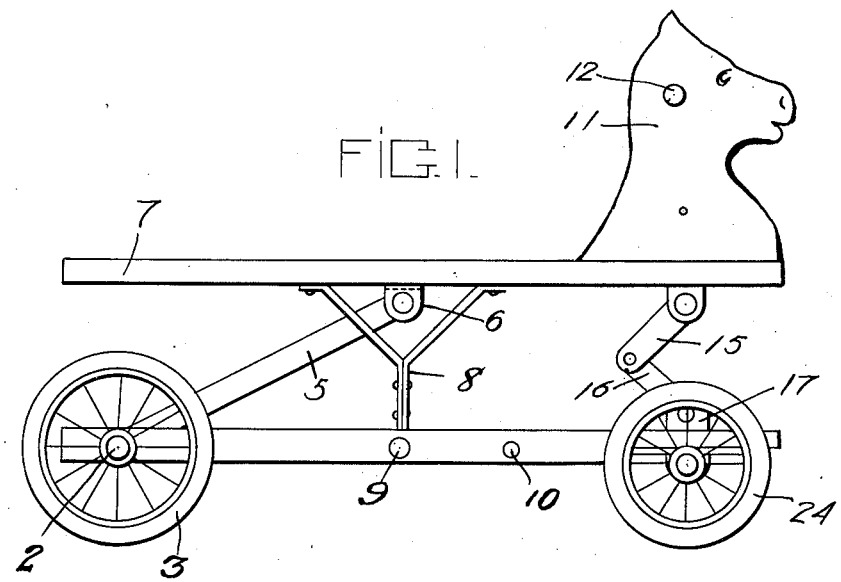
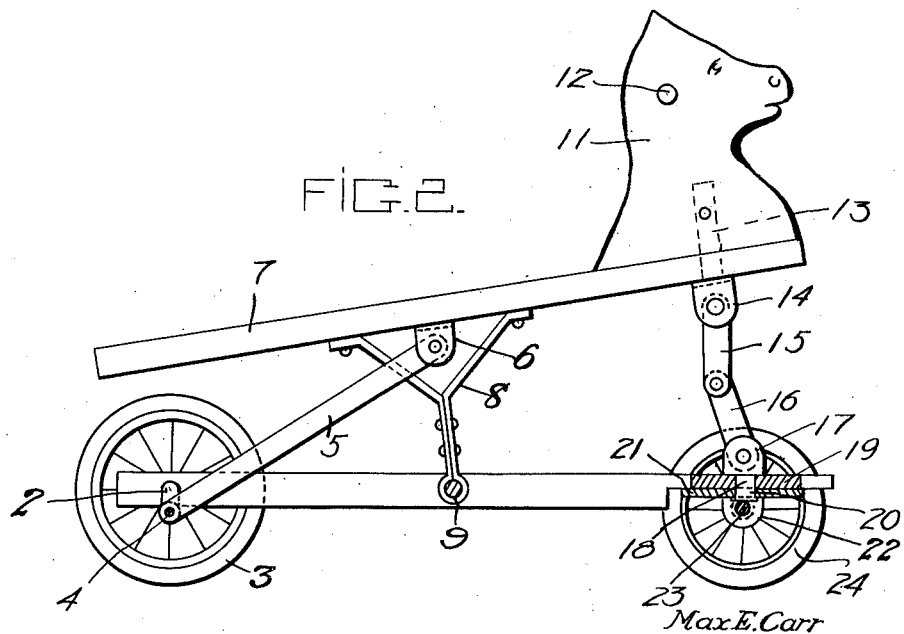
WITNESS:
INVENTOR.
Max E. Carr
BY
Victor J. Evans
ATTORNEY.

M. E. CARR.
TOY VEHICLE.
APPLICATION FILED SEPT. 23, 1919.
1,345,127.
Patented June 29, 1920.
2 SHEETS—SHEET 2.
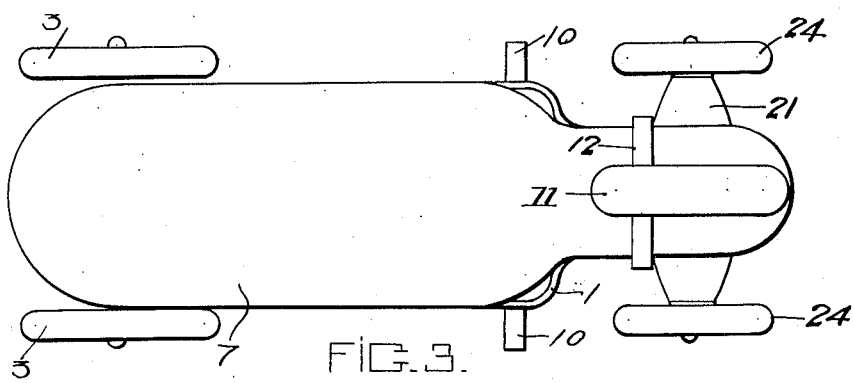
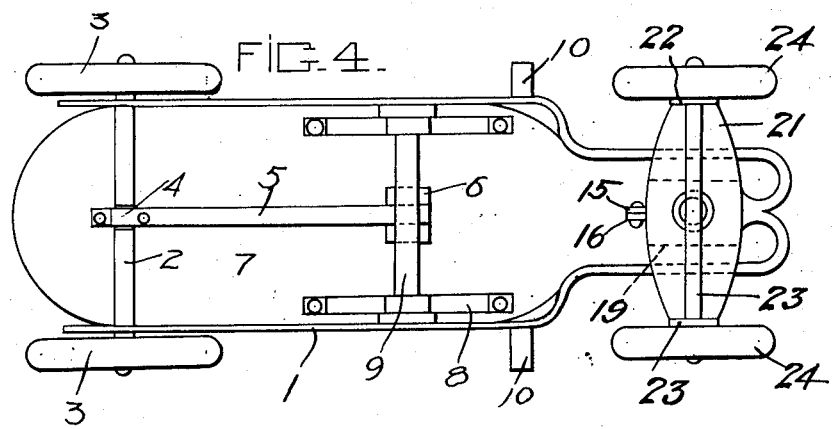
Max E. Carr
INVENTOR.
WITNESS:
BY
Victor J. Evans
ATTORNEY.

UNITED STATES PATENT OFFICE.

MAX E. CARR, OF CHICAGO, ILLINOIS.

TOY VEHICLE.

1,345,127.

Specification of Letters Patent.  Patented June 29, 1920.

Application filed September 23, 1919. Serial No. 325,673.

*To all whom it may concern:*

Be it known that I, MAX E. CARR, a citizen of the United States, residing at Chicago, in the county of Cook and State of Illinois, have invented new and useful Improvements in Toy Vehicles, of which the following is a specification.

This invention relates to toy vehicles, and more particularly to a vehicle of that type which is propelled by the operator through the medium of an oscillating or rocking seat.

One of the main objects of the invention is to provide a vehicle of the character stated of simple construction and operation which may be readily produced and sold at low cost. A further object is to provide simple and efficient means for steering the vehicle, the main steering member being at all times in predetermined relation to the rockable seat so as to be readily grasped. Further objects will appear from the detailed description.

In the drawings:—

Figure 1 is a side view of the vehicle with the seat board in normal position.

Fig. 2 is a similar view with the seat board tilted.

Fig. 3 is a top plan view.

Fig. 4 is an underneath plan view.

The vehicle is provided with a bent metal frame 1 which rotatably supports, adjacent its rear end, an axle 2 on which are secured the rear ground wheels 3. This axle is provided with a central crank 4 (Figs. 2 and 4) connected by a pitman rod 5 to a U-bracket 6 depending from and secured in a seat board 7, the upper end of the pitman rod being pivotably secured in this bracket.

The seat board is rockably supported by brackets 8 on a transverse shaft 9 secured in the frame centrally thereof. The operator, seated upon board 7 with his feet upon foot rests 10 projecting from the frame, may readily rock the board so as to reciprocate pitman rod 5 thus rotating axle 2 and propelling the vehicle.

A steering member 11, preferably in the form of a horse's head, is mounted at the forward end of the seat board, a rod 12 being secured through this member to provide suitable hand grips. This head is secured upon a shank 13 of a U-member 14 positioned beneath the board, the shank fitting snugly through an opening in the board and being free to turn in either direction (Fig. 2). Member 14 receives the upper end of a link 15 pivotally secured therein, the lower end of this link being pivotally secured to the upper end of a similar link 16 the lower end of which is pivotally secured in a member 17 corresponding to member 14. Member 17 is provided with a shank 18 fitting snugly through an opening in a block 19 carried at the forward end of frame 1 so as to be readily turned in either direction. The lower end portion of shank 18 is squared, as at 20, and secured through a steering plate 21 centrally thereof, this plate fitting against the under face of block 19. Plate 21 is turned downwardly at each end to provide a bracket 22, these brackets serving to support a front axle 23 upon which the front ground wheels 24 are rotatably mounted. By connecting the steering member 11 to the plate 21 in the manner described and illustrated, I insure simple and accurate control of the vehicle, and the main steering member is at all times in a predetermined relation to the seat board so as to be readily grasped for steering purposes while also providing an easily accessible hand hold for the operator of the vehicle. The turning of head 11 in the direction in which it is desired to travel turns plate 21 in a similar direction thus giving ready control of the vehicle, it being understood that the frame 1 is so shaped as to readily permit the turning of this plate in either direction desired, as illustrated.

What I claim is:—

1. In a toy vehicle, a frame, a main driving axle, a steering axle, a seat board rockably supported by the frame, driving connections between said board and the means for rotating said axle by rocking the board, a main steering member mounted on the board and rotatable independently thereof, and operating connections between said steering member and the steering axle.

2. In a toy vehicle, a frame, driving wheels, steering wheels, a seat board rockably supported by said frame, driving connections between said board and the driving wheels for rotating said wheels by rocking the board, a steering member carried by the board and rotatable independently thereof, and folding link connections between the steering wheels and the main steering member for steering the wheels during working of said board.

3. In a toy vehicle, a frame, a board mounted thereon and movable independently of the frame, driving wheels, a steering axle, steering wheels carried thereby, driving connections between said board and the driving wheels, a main steering member rotatably mounted on the board, a steering plate rotatably mounted on the frame and supporting said steering axle, and folding link connections between the main steering member and the plate for turning said plate with said member.

In testimony whereof I affix my signature.

MAX E. CARR.